US012087251B2

(12) United States Patent
Guo et al.

(10) Patent No.: US 12,087,251 B2
(45) Date of Patent: Sep. 10, 2024

(54) METHOD FOR CONTROLLING DISPLAY SCREEN, DEVICE, AND STORAGE MEDIUM

(71) Applicant: BEIJING XIAOMI MOBILE SOFTWARE CO., LTD., Beijing (CN)

(72) Inventors: Rui Guo, Beijing (CN); Zhaonan Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 225 days.

(21) Appl. No.: 17/826,587

(22) Filed: May 27, 2022

(65) Prior Publication Data

US 2023/0154435 A1 May 18, 2023

(30) Foreign Application Priority Data

Nov. 18, 2021 (CN) ......................... 202111367669.0

(51) Int. Cl.
*G09G 5/10* (2006.01)
*G09G 3/32* (2016.01)

(52) U.S. Cl.
CPC ................. *G09G 5/10* (2013.01); *G09G 3/32* (2013.01); *G09G 2320/041* (2013.01); *G09G 2320/064* (2013.01); *G09G 2320/0653* (2013.01)

(58) Field of Classification Search
CPC ...... G09G 5/10; G09G 3/32; G09G 2320/041; G09G 2320/064; G09G 2320/0653
USPC .......................................................... 345/204
See application file for complete search history.

(56) References Cited

U.S. PATENT DOCUMENTS

2010/0296026 A1* 11/2010 Kubota ............. G02F 1/133615 349/62
2013/0141896 A1* 6/2013 Li ..................... G02F 1/133608 362/97.3
2017/0047044 A1* 2/2017 Zheng ....................... G09G 3/32
2017/0098418 A1* 4/2017 Kim ..................... G09G 3/3413
2019/0331950 A1* 10/2019 Yoda .................... G09G 3/3611
2019/0341760 A1* 11/2019 Okura .................... H02G 15/10
2019/0384441 A1* 12/2019 Seo ....................... G06F 3/0416

FOREIGN PATENT DOCUMENTS

CN 106409223 A * 2/2017 ........... G09G 3/3208
CN 107436660 A * 12/2017
CN 107465811 A * 12/2017 ........... G09G 3/3406
CN 108922479 A * 11/2018 ........... G09G 3/3406
CN 209086907 A 7/2019

OTHER PUBLICATIONS

CNOA of Application No. 2012111367669.0 dated on Jul. 5, 2022 with English translation, (17p).
Extended European Search Report issued in Application No. 22176156.2, dated Sep. 8, 2022, (14p).

* cited by examiner

*Primary Examiner* — Mark Edwards
(74) *Attorney, Agent, or Firm* — Arch & Lake LLP

(57) ABSTRACT

A method and an apparatus for controlling display screen, and a storage medium are provided. The method includes: acquiring temperature information of a target region of a display control chip, in which the display control chip is configured to control display of a display screen by controlling display of a LED light plate of a display module of an electronic device; adjusting brightness of the display screen of the electronic device according to the temperature information of the target region.

16 Claims, 2 Drawing Sheets

METHOD FOR CONTROLLING DISPLAY SCREEN, DEVICE, AND STORAGE MEDIUM

CROSS REFERENCE TO RELATED APPLICATION

This application claims the benefit of priority to Chinese patent application No. 202111367669.0, filed on Nov. 18, 2021, the entire disclosure of which is incorporated herein by reference for all purposes.

FIELD

The present disclosure relates to a field of intelligent terminal technologies, and more particularly, to a method for controlling display screen, a device, and a storage medium.

BACKGROUND

Backlight is a kind of light source behind a liquid crystal display LCD. Luminous effect of the backlight may directly affect a visual effect of an LCD module. A liquid crystal itself does not emit light, may modulate the light so as to have a result that the LCD displays graphics or characters. Mini LED (light-emitting diode), as a frontier technology of backlight display, is to change a side entry LDE light bar into a straight down LED light plate, and preform zoning management, to control brightness of different regions of the LED light plate through a control chip, so as to achieve a display effect with high contrast.

SUMMARY

Embodiments of a first aspect of the present disclosure provide a method for controlling a display screen. The method includes:

- acquiring temperature information of a target region of a display control chip, in which the display control chip is configured to control brightness of a LED light plate of a display module of an electronic device;
- adjusting brightness of the display screen of the electronic device according to the temperature information of the target region.

Embodiments of a second aspect of the present disclosure provide an electronic device. The electronic device includes a main control chip, a display control chip, a temperature sensor and a display module, in which,

- the display module includes a LED light plate and a display screen;
- the display control chip, coupled with the LED light plate, is configured to control brightness of the LED light plate;
- the temperature sensor, provided around the display control chip, is configured to acquire temperature information of a target region of the display control chip;
- the main control chip is configured to adjust brightness of the display screen according to the temperature information of the target region of the display control chip acquired by the temperature sensor.

Embodiments of a third aspect of the present disclosure provide a computer-readable storage medium having a computer program stored thereon. When the program is executed by a processor, the method includes:

- acquiring temperature information of a target region of a display control chip, in which the display control chip is configured to control brightness of a LED light plate of a display module of an electronic device;

- adjusting brightness of the display screen of the electronic device according to the temperature information of the target region.

It should be understood that the above general description and the following detailed description are only exemplary and explanatory, and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
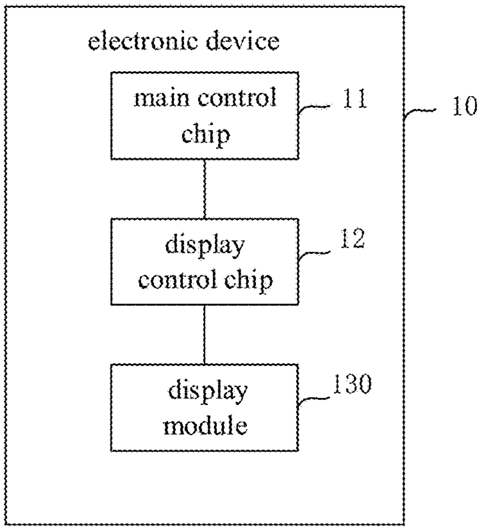
FIG. 1 is a block diagram illustrating an apparatus for controlling a display screen according to an embodiment of the present disclosure.

In order to enable ordinary skilled people in the art to better understand the technical solution of the present disclosure, the technical solution of embodiments of the present disclosure will be clearly and completely described below in combination with the accompanying drawings.

It should be noted that the terms "first" and "second" in the description and claims of the present disclosure and the accompanying drawings are used to distinguish similar objects, and not be used to describe a specific order or sequence. It should be understood that the data such used can be interchanged where appropriate so that the embodiments of the present disclosure described herein can be implemented in an order other than those illustrated or described herein. The implementations set forth in the following description of exemplary embodiments do not represent all implementations consistent with the present disclosure. Instead, they are merely examples of apparatuses and methods consistent with aspects related to the present disclosure as recited in the appended claims.

In related art, a technology of Mini LED backlight display adopts a large number of LED lights, resulting in huge heat, and temperature at a region of the display control chip may exceed a standard value. The traditional way is to use a heat dissipation diaphragm to physically dissipate the heat of the display control chip. Intelligent degree of temperature management is low and an effect of temperature control is poor.

To resolve the above-mentioned technical problems, in some embodiments of the present disclosure, temperature information of a target region of a display control chip is acquired, in which the display control chip is configured to control display of a display screen by controlling display of a LED light plate of a display module of an electronic device. The brightness of the display screen of the electronic device is adjusted according to the temperature information of the target region. Therefore, the present disclosure may monitor the temperature information of the target region of the display control chip, adjust the brightness of the display screen according to the monitored temperature information of the target region, so as to control the temperature of the target region and improve performance of temperature control of the device.

It is noted that the temperature at the region of the display control chip exceeding the standard value may be resulted by, on the one hand, heat produced by the display control chip during its own operation; on the other hand, heat of a LED light source external to the display control chip. In the present disclosure, after the temperature at the region of the display control chip exceeds the standard value, the brightness of the display screen of the electronic device is reduced, that is, the brightness of the LED light plate of the display module of the electronic device is reduced. Therefore, an effect of reducing the temperature may be achieved by reducing the heat of the LED light source external to the display control chip.

The technical solutions provided by the various embodiments of the present disclosure will be described in detail below with reference to the accompanying drawings.

FIG. 1 is a block diagram illustrating an apparatus for controlling a display screen according to an embodiment of the present disclosure. As illustrated in FIG. 1, the apparatus 10 for controlling the display screen includes a main control chip 11, a display control chip 12 and a display module 130.

The main control chip 11 is configured to control each element in the apparatus for controlling the display screen.

The display control chip 12 is configured to control display of a LED light plate of the display module 130 to control the display of the display screen.

The display module 130 is configured to provide backlight display for the apparatus 10 for controlling the display screen.

Figure 2:
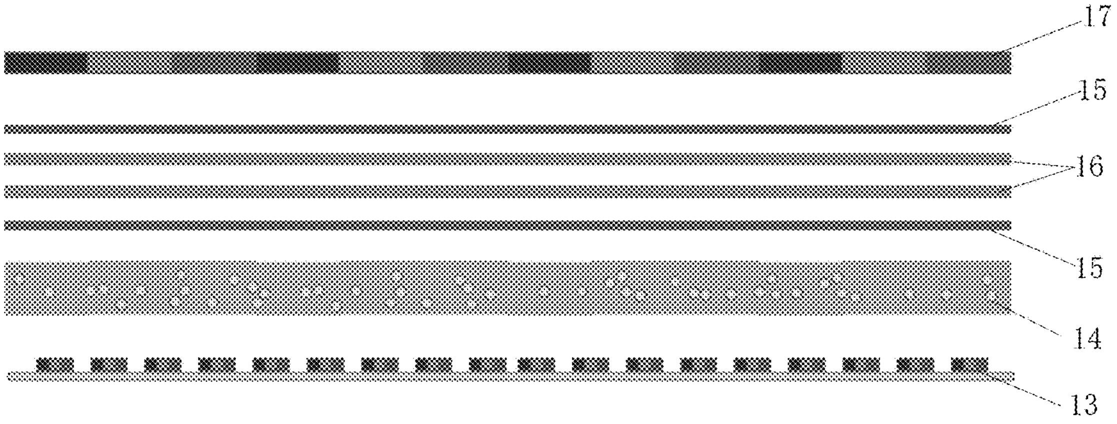
FIG. 2 is a schematic diagram illustrating a structure of display module according to an embodiment of the present disclosure.

FIG. 2 is a schematic diagram illustrating a structure of display module according to an embodiment of the present disclosure. As s illustrated in FIG. 2, the display module 130 includes an LED light plate 13, a diffuser panel 14, diffuser sheets 15, an incremental sheet 16 and a display screen 17. The diffuser sheets 15 may include a first diffuser sheet and a second diffuser sheet. The LED light plate 13, the diffuser plate 14, the first diffuser sheet, the incremental sheet 16, the second diffuser sheet and the display screen 17 are stacked successively. As illustrated in FIG. 2, the number of the incremental sheets 16 may be two, which will not be limited in the present disclosure. In a certain embodiment of the present disclosure, the display module 130 has a simple and compact structure. It is noted that the structure of the display module 130 in embodiments of the present disclosure is an illustrative description, which will not be limited hereinafter, and may be adjusted according to actual situations.

In an alternative embodiment, the apparatus 10 for controlling the display screen further includes a main control board and a display control board, the main control chip 11 may be on the main control board, and the display control chip 12 may be on the display control board. The display control chip 12 may include a timing control chip and a backlight control chip. It is noted that the main control chip 11 and the display control chip 12 may also be integrated on one circuit board.

In an example, the display control board and the display module 130 are stacked, and a region corresponding to a relative position between the display control chip 12 on the display control board and the display screen 17 of the display module 130 forms the second region of the display screen.

In an example, the main control board may be arranged side by side with the display control board, or may be stacked with the display control board and the display module 130. In an embodiment of the present disclosure, a positional relationship of the display control board, the main control board and the display module 130 is not limited and may be adjusted according to the actual situations.

In this embodiment of the present disclosure, in order to reasonably control the temperature of the display control chip 12, a temperature sensor is arranged around the display control chip 12, and the main control chip 11 is configured to obtain temperature information of a target region corresponding to the display control chip 12 through the temperature sensor, and to adjust brightness of the display screen according to the temperature information of the target region.

The temperature sensor may include, but is not limited to, a digital sensor and a thermistor sensor.

In a case that the temperature sensor is the digital sensor, a decoder corresponding to the digital sensor may be configured around the digital sensor or on the display control board. A measurement result of the digital sensor is less affected by a material of a connecting wire of the digital sensor, and a temperature measurement value is more accurate.

In a case that the temperature sensor is the thermistor sensor, the temperature sensor may directly convert a measured voltage value into a temperature value, without the decoder.

In some embodiments, a detection manner of the temperature value of the target region of the display control chip may include, but is not limited to, the following detection manners:

First detection manner: one or more temperature sensors are arranged in a middle position between the timing control chip and the backlight control chip, and the main control chip 11 calculates the temperature value of the target region according to the temperature values collected by the one or more temperature sensors.

Second detection manner: a first temperature sensor and a second temperature sensor are arranged around respective the timing control chip and the backlight control chip. Each of the first temperature sensor and the second temperature sensor may be one or more. The main control chip 11 calculates the temperature value of the target region according to the temperature values collected by the first temperature sensor and the second temperature sensor.

In the first detection manner, in a case that one temperature sensor is arranged in the middle between the timing control chip and the backlight control chip, a temperature value collected by the temperature sensor is determined as the temperature value of the target region. In a case that a plurality of temperature sensors are arranged in the middle between the timing control chip and the backlight control chip, the plurality of temperature sensors may detect a plurality of temperature values, the main control chip 11 may calculate the temperature value of the target region according to the plurality of temperature values. For example, a maximum temperature value selected from the plurality of temperature values is determined as the temperature value of the target region. For another example, an average value of the plurality of temperature values is calculated, and the average value of the plurality of temperature values is determined as the temperature value of the target region.

In the second detection manner, in a case that a first temperature sensor and a second temperature sensor are arranged around respective the timing control chip and the backlight control chip. The temperature value detected by the first temperature sensor is determined as a temperature value of the region where the timing control chip is located and the temperature value detected by the second temperature sensor is determined as a temperature value of the region where the backlight control chip is located. The main control chip 11 calculates the temperature value of the target region according to the temperature value of the region where the timing control chip is located and the temperature value of the region where the backlight control chip is located. For example, the main control chip 11 may calculate an average value of the temperature value of the region where the timing control chip is located and the temperature value of the region where the backlight control chip is located, and determine the average value as the temperature value of the target region. For another example, the main control chip 11 may calculate the temperature value of the target region according to the temperature value of the region where the timing control chip is located, the temperature value of the region where the backlight control chip is located and weight values occupied by the respective temperature values. For another example, the main control chip 11 may determine a maximum value of the temperature value of the region where the timing control chip is located and the temperature value of the region where the backlight control chip is located as the temperature value of the target region.

In the second detection manner, in a case that a plurality of first temperature sensors and a plurality of second temperature sensors are arranged around respective the timing control chip and the backlight control chip, the main control chip 11 may determine the temperature value of the region where the timing control chip is located according to temperature values detected by the plurality of first temperature sensors. For example, an average value of the temperature values detected by the plurality of first temperature sensors is calculated as the temperature value of the region where the timing control chip is located. For another example, a maximum temperature value selected from the plurality of first temperature sensors is calculated as the temperature value of the region where the timing control chip is located. The main control chip 11 may determine the temperature value of the region where the backlight control chip is located according to temperature values detected by the plurality of second temperature sensors. For example, an average value of the temperature values detected by the plurality of second temperature sensors is calculated as the temperature value of the region where the backlight control chip is located. For another example, a maximum temperature value selected from the plurality of second temperature sensors is calculated as the temperature value of the region where the backlight control chip is located. The main control chip 11 may calculate the temperature value of the target region according to the temperature value of the region where the timing control chip is located and the temperature value of the region where the backlight control chip is located. For example, the main control chip 11 may calculate an average value of the temperature value of the region where the timing control chip is located and the temperature value of the region where the backlight control chip is located, and determine the average value as the temperature value of the target region. For another example, the main control chip 11 may calculate the temperature value of the target region according to the temperature value of the region where the timing control chip is located, the temperature value of the region where the backlight control chip is located and weight values occupied by the respective temperature values.

The main control chip 11 may adjust the brightness of the display screen according to the temperature information of the target region, which may include, but is not limited to, the following adjustment manners.

First adjustment manner: the temperature information may include a temperature value. It is determined whether the temperature value of the target region is greater than a preset temperature threshold value. The brightness of the display screen is reduced in response to the temperature value of the target region being greater than the preset temperature threshold value. The preset temperature threshold value may be, for example, 60° C. or 65° C. It is noted that a specific value of the preset temperature threshold value will not be limited in the preset disclosure, and may be adjusted according to the actual situation.

Second adjustment manner, the temperature information may include a temperature state. The brightness of the display screen may be reduced in response to the temperature state of the target region being a high temperature state. The temperature state of the target region is the high temperature state when the temperature value of the target region is greater than the preset temperature threshold value, and the temperature state of the target region is a normal temperature state when the temperature value of the target region is less than or equal to the preset temperature threshold value. It is noted that a specific value of the preset temperature threshold value will not be limited in the preset disclosure, and may be adjusted according to the actual situation.

In some embodiments, adjusting the brightness of the display screen may include, but is not limited to, the following brightness adjustment manners:

First brightness adjustment manner: the brightness of the display screen is reduced from a current brightness to brightness having a preset proportion to the current brightness.

Second brightness adjustment manner: brightness of a second region of the display screen corresponding to the target region is reduced. It is noted that the second region of the display screen corresponding to the target region refers to a region of the display screen corresponding to the display control chip. An area of the second region of the display screen may be slightly larger or smaller than that of the target region. For example, the area of the second region of the display screen may equal to the area of the target region. The area of the second region of the display screen may be adjusted according to the actual situation, which is not limited hereinafter.

Third brightness adjustment manner: a plurality of image frames played by the display screen within a preset time period is acquired, each image frame may include a plurality of pixels, and each pixel corresponds to one pixel region of the display screen. A plurality of voltage values of the pixel regions of the display screen corresponding to any pixel in the plurality of image frames are determined, any pixel is a pixel at a same position of the plurality of image frames. A target pixel is selected from the plurality of pixels, and the pixel region of the display screen corresponding to the target pixel is determined as a first region of the display screen, the target pixel may be a pixel that a variation range of the plurality of voltage values corresponding to the pixel meets a preset range. The brightness of the first region of the display screen is reduced.

In the first brightness adjustment manner, the brightness of the display screen is reduced from the current brightness to the brightness having the preset proportion to the current brightness. In an implementation manner, the brightness of the display screen may be directly reduced from the current brightness to the brightness having the preset proportion to the current brightness. For example, the brightness of the display screen may be directly reduced from the current brightness to 90% of the current brightness. In another implementation manner, the brightness of the display screen is reduced from the current brightness to the brightness having the preset proportion to the current brightness according to a preset speed of brightness reduction. For example, the brightness of the display may reduce the current brightness to 90% of the current brightness with a speed of reducing the current brightness by 1% every 5 seconds. In this brightness adjustment manner, reducing the overall brightness of the display screen may greatly reduce the heat dissipated by the entire LED light plate, and may control the temperature of the device to reduce rapidly.

In the second brightness adjustment manner, the brightness of the second region of the display screen corresponding to the target region is reduced. In an implementation manner, the brightness of the second region of the display screen is reduced from the current brightness to the brightness having the preset proportion to the current brightness. For example, the brightness of the second region of the display screen may be directly reduced from the current brightness to 90% of the current brightness. In another implementation manner, the second region of the display screen is located at a lower portion of the display screen, and the brightness of the second region of the display screen is gradually reduced from top to bottom. For example, a height of the second region of the display screen may be 30 mm, and the brightness of the second region of the display screen may sequentially reduce by 1% of the brightness of the previous region every 2 mm to 3 mm. When the second region of the display screen is located at the lower portion of the display screen, since the lower portion of the display screen is generally a region with less content displayed, the second brightness adjustment manner may be employed, which may ensure user experiences to the greatest extent.

In the third brightness adjustment manner, sixty image frames played by the display screen within 30 seconds are continuously acquired. The sixty image frames may be divided into the plurality of pixels, and each pixel point is located at the same position of the 60 image frames. The plurality of voltage values of the pixel regions of the display screen corresponding to each pixel in the sixty image frames may be determined. The variation range of the plurality of voltage values of each pixel may be calculated. In response to the variation range of the plurality of voltage values of each pixel being less than a preset range, it indicates that the pixel is an unimportant pixel, and the target pixel that the variation range of the plurality of voltage values corresponding to the pixel meets the preset range may be determined from the plurality of pixels, the content in the image frames corresponding to the target pixel is unimportant content, and the pixel region of the display screen corresponding to the target pixel is determined as the first region of the display screen, and the brightness of the first region of the display screen is reduced.

In some embodiments, the main control chip 11 adjusts the brightness of the display screen according to the temperature information of the target region. In an implementation manner, the main control chip 11 transmits a display brightness reduction instruction to the backlight control chip, to enable the backlight control chip to reduce the brightness of the display screen by controlling the brightness of the LED light plate to reduce according to the display brightness reduction instruction. For example, the main control chip 11 transmits the display brightness reduction instruction to the timing control chip, to enable the timing control chip to transmit the display screen brightness reduction instruction to the backlight control chip.

For example, an embedded controller of the main control chip 11 receives the temperature value of the target region transmitted by the temperature sensor. In response to the temperature value of the target region being greater than the preset temperature threshold value, the embedded controller transmits the display brightness reduction instruction to a GPU (graphics processing unit), and the GPU may transmit the display brightness reduction instruction to the timing control chip, and the timing control chip may transmit the display brightness reduction instruction to the backlight control chip. The backlight control chip may reduce the brightness of the display screen by controlling the brightness of the LED light plate to reduce according to the display brightness reduction instruction.

In some embodiments, the temperature sensor may be coupled to the main control chip 11 via a screen cable with a high-definition ultra-fine coaxial line. A connector of the screen cable with the high-definition ultra-fine coaxial line prepares unconnected pins for communication in advance, and is configured to establish a communication relationship between the temperature sensor and the main control chip 11.

In the above apparatus embodiments of the present disclosure, the temperature information of the target region of the display control chip is acquired, in which the display control chip is configured to control the display of the display screen by controlling display of the LED light plate of the display module of the electronic device. The brightness of the display screen of the electronic device is adjusted according to the temperature information of the target region. Therefore, the present disclosure may monitor the temperature information of the target region of the display control chip, adjust the brightness of the display screen according to the monitored temperature information of the target region, so as to control the temperature of the target region and improve performance of temperature control of the device.

Figure 3:
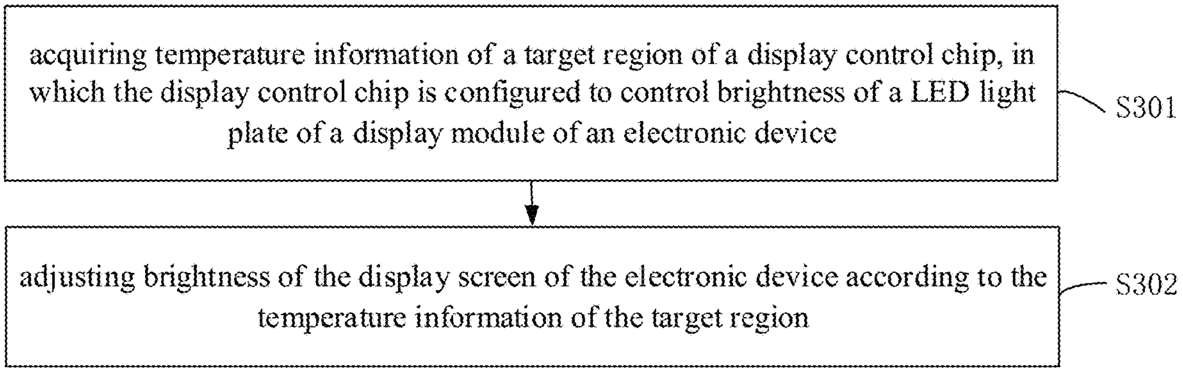
FIG. 3 is a flow chart illustrating a method for controlling a display screen according to an embodiment of the present disclosure.

FIG. 3 is a flow chart illustrating a method for controlling a display screen according to an embodiment of the present disclosure. As illustrated in FIG. 3, the method includes the following blocks.

At block S301, temperature information of a target region of a display control chip is acquired. The display control chip is configured to control display of a display screen by controlling display of a LED light plate of a display module of an electronic device. The temperature information may include one or more temperature parameters from the corresponding temperature sensors located near or in the target region.

At block S302, brightness of the display screen of the electronic device is adjusted according to the temperature information of the target region.

In an embodiment, an apparatus for controlling the display screen may include a main control chip, a display control chip and a display module.

The main control chip is configured to control each element in the apparatus for controlling the display screen.

The display control chip is configured to control the display of the LED light plate of the display module to control the display of the display screen.

The display module is configured to provide the backlight display for the apparatus for controlling the display screen.

In an alternative embodiment, the apparatus for controlling the display screen may further include a main control board and a display control board, the main control chip may be on the main control board, and the display control chip may be on the display control board. The display control chip may include a timing control chip and a backlight control chip. It is noted that the main control chip and the display control chip may also be integrated on one circuit board.

In an example, the display control board and the display module are stacked, and a region corresponding to a relative position between the display control chip on the display control board and the display screen of the display module forms the second region of the display screen.

In an example, the main control board may be arranged side by side with the display control board, or may be stacked with the display control board and the display module. In an embodiment of the present disclosure, a positional relationship of the display control board, the main control board and the display module is not limited and may be adjusted according to actual situations.

In this embodiment of the present disclosure, in order to reasonably control the temperature of the display control chip, a temperature sensor is arranged around the display control chip, and the main control chip is configured to obtain temperature information of a target region corresponding to the display control chip through the temperature sensor, and to adjust brightness of the display screen according to the temperature information of the target region.

The temperature sensor may include, but is not limited to, a digital sensor and a thermistor sensor.

In a case that the temperature sensor is the digital sensor, a decoder corresponding to the digital sensor may be configured around the digital sensor or on the display control board. A measurement result of the digital sensor is less affected by a material of a connecting wire of the digital sensor, and a temperature measurement value is more accurate.

In a case that the temperature sensor is the thermistor sensor, the temperature sensor may directly convert a measured voltage value into a temperature value, without the decoder.

In some embodiments, a detection manner of the temperature value of the target region of the display control chip may include, but is not limited to, the following detection manners:

First detection manner: one or more temperature sensors are arranged in a middle position between the timing control chip and the backlight control chip, and the main control chip calculates the temperature value of the target region according to the temperature values collected by the one or more temperature sensors.

Second detection manner: a first temperature sensor and a second temperature sensor are arranged around respective the timing control chip and the backlight control chip. Each of the first temperature sensor and the second temperature sensor may be one or more. The main control chip calculates the temperature value of the target region according to the temperature values collected by the first temperature sensor and the second temperature sensor.

In the first detection manner, in a case that one temperature sensor is arranged in the middle between the timing control chip and the backlight control chip, a temperature value collected by the temperature sensor is determined as the temperature value of the target region. In a case that a plurality of temperature sensors are arranged in the middle between the timing control chip and the backlight control chip, the plurality of temperature sensors may detect a plurality of temperature values, the main control chip may calculate the temperature value of the target region according to the plurality of temperature values. For example, a maximum temperature value selected from the plurality of temperature values is determined as the temperature value of the target region. For another example, an average value of the plurality of temperature values is calculated, and the average value of the plurality of temperature values is determined as the temperature value of the target region.

In the second detection manner, in a case that a first temperature sensor and a second temperature sensor are arranged around respective the timing control chip and the backlight control chip. The temperature value detected by the first temperature sensor is determined as a temperature value of the region where the timing control chip is located and the temperature value detected by the second temperature sensor is determined as a temperature value of the region where the backlight control chip is located. The main control chip calculates the temperature value of the target region according to the temperature value of the region where the timing control chip is located and the temperature value of the region where the backlight control chip is located. For example, the main control chip may calculate an average value of the temperature value of the region where the timing control chip is located and the temperature value of the region where the backlight control chip is located, and determine the average value as the temperature value of the target region. For another example, the main control chip may calculate the temperature value of the target region according to the temperature value of the region where the timing control chip is located, the temperature value of the region where the backlight control chip is located and weight values occupied by the respective temperature values.

In the second detection manner, in a case that a plurality of first temperature sensors and a plurality of second temperature sensors are arranged around respective the timing control chip and the backlight control chip, the main control chip may determine the temperature value of the region where the timing control chip is located according to temperature values detected by the plurality of first temperature sensors. For example, an average value of the temperature values detected by the plurality of first temperature sensors is calculated as the temperature value of the region where the timing control chip is located. For another example, a maximum temperature value selected from the plurality of first temperature sensors is calculated as the temperature value of the region where the timing control chip is located. The main control chip may determine the temperature value of the region where the backlight control chip is located according to temperature values detected by the plurality of second temperature sensors. For example, an average value of the temperature values detected by the plurality of second temperature sensors is calculated as the temperature value of the region where the backlight control chip is located. For another example, a maximum temperature value selected from the plurality of second temperature sensors is calculated as the temperature value of the region where the backlight control chip is located. The main control chip may calculate the temperature value of the target region according to the temperature value of the region where the timing control chip is located and the temperature value of the region where the backlight control chip is located. For example, the main control chip may calculate an average value of the temperature value of the region where the timing control chip is located and the temperature value of the region where the backlight control chip is located, and determine the average value as the temperature value of the target region. For another example, the main control chip may calculate the temperature value of the target region according to the temperature value of the region where the timing control chip is located, the temperature value of the region where the backlight control chip is located and weight values occupied by the respective temperature values.

The main control chip may adjust the brightness of the display screen according to the temperature information of the target region, which may include, but is not limited to, the following adjustment manners.

First adjustment manner: the temperature information may be a temperature value. It is determined whether the temperature value of the target region is greater than a preset temperature threshold value. The brightness of the display screen is reduced in response to the temperature value of the target region being greater than the preset temperature threshold value. The preset temperature threshold value may be, for example, 60° C. or 65° C. It is noted that a specific value of the preset temperature threshold value will not be limited in the preset disclosure, and may be adjusted according to the actual situation.

Second adjustment manner, the temperature information may be a temperature state. The brightness of the display screen may be reduced in response to the temperature state of the target region being a high temperature state. The temperature state of the target region is the high temperature state when the temperature value of the target region is greater than the preset temperature threshold value, and the temperature state of the target region is a normal temperature state when the temperature value of the target region is less than or equal to the preset temperature threshold value. It is noted that a specific value of the preset temperature threshold value will not be limited in the preset disclosure, and may be adjusted according to the actual situation.

In some embodiments, adjusting the brightness of the display screen may include, but is not limited to, the following brightness adjustment manners:

First brightness adjustment manner: the brightness of the display screen is reduced from a current brightness to brightness having a preset proportion to the current brightness.

Second brightness adjustment manner: brightness of a second region of the display screen corresponding to the target region is reduced. It is noted that the second region of the display screen corresponding to the target region refers to a region of the display screen corresponding to the display control chip. An area of the second region of the display screen may be slightly larger or smaller than that of the target region. For example, the area of the second region of the display screen may equal to the area of the target region. The area of the second region of the display screen may be adjusted according to the actual situation, which is not limited hereinafter.

In the first brightness adjustment manner, the brightness of the display screen is reduced from the current brightness to the brightness having the preset proportion to the current brightness. In an implementation manner, the brightness of the display screen may be directly reduced from the current brightness to the brightness having the preset proportion to the current brightness. For example, the brightness of the display screen may be directly reduced from the current brightness to 90% of the current brightness. In another implementation manner, the brightness of the display screen is reduced from the current brightness to the brightness having the preset proportion to the current brightness according to a preset speed of brightness reduction. For example, the brightness of the display may reduce the current brightness to 90% of the current brightness with a speed of reducing the current brightness by 1% every 5 seconds. In this brightness adjustment manner, reducing the overall brightness of the display screen may greatly reduce the heat dissipated by the entire LED light plate, and may control the temperature of the device to reduce rapidly.

In the second brightness adjustment manner, the brightness of the second region of the display screen corresponding to the target region is reduced. In an implementation manner, the brightness of the second region of the display screen is reduced from the current brightness to the brightness having the preset proportion to the current brightness. For example, the brightness of the second region of the display screen may be directly reduced from the current brightness to 90% of the current brightness. In another implementation manner, the second region of the display screen is located at a lower portion of the display screen, and the brightness of the second region of the display screen is gradually reduced from top to bottom. For example, a height of the second region of the display screen may be 30 mm, and the brightness of the second region of the display screen may sequentially reduce by 1% of the brightness of the previous region every 2 mm to 3 mm. When the second region of the display screen is located at the lower portion of the display screen, since the lower portion of the display screen is generally a region with less content displayed, the second brightness adjustment manner may be employed, which may ensure user experiences to the greatest extent.

In some embodiments, the main control chip adjusts the brightness of the display screen according to the temperature information of the target region. In an implementation manner, the main control chip transmits a display brightness reduction instruction to the backlight control chip, to enable the backlight control chip to reduce the brightness of the display screen by controlling the brightness of the LED light plate to reduce according to the display brightness reduction instruction. For example, the main control chip transmits the display brightness reduction instruction to the timing control chip, to enable the timing control chip to transmit the display screen brightness reduction instruction to the backlight control chip.

For example, an embedded controller of the main control chip receives the temperature value of the target region transmitted by the temperature sensor. In response to the temperature value of the target region being greater than the preset temperature threshold value, the embedded controller transmits the display brightness reduction instruction to a GPU, and the GPU may transmit the display brightness reduction instruction to the timing control chip, and the timing control chip may transmit the display brightness reduction instruction to the backlight control chip. The backlight control chip may reduce the brightness of the display screen by controlling the brightness of the LED light plate to reduce according to the display brightness reduction instruction.

In some embodiments, the temperature sensor may be coupled to the main control chip 11 via a screen cable with a high-definition ultra-fine coaxial line. A connector of the screen cable with the high-definition ultra-fine coaxial line prepares unconnected pins for communication in advance, and is configured to establish a communication relationship between the temperature sensor and the main control chip.

Figure 4:
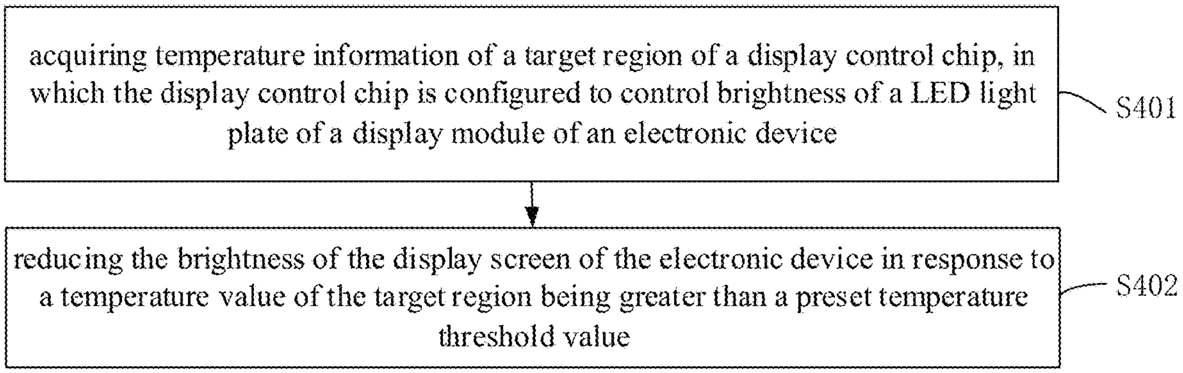
FIG. 4 is a flow chart illustrating a method for controlling a display screen according to another embodiment of the present disclosure.

Based on the description of the above embodiments, FIG. 4 is a flow chart illustrating a method for controlling a display screen according to another embodiment of the present disclosure. As illustrated in FIG. 4, the method includes the following blocks.

At block S401, temperature information of a target region of a display control chip is acquired. The display control chip is configured to control display of a display screen by controlling display of a LED light plate of a display module of an electronic device.

At block S402, the brightness of the display screen of the electronic device is reduced in response to a temperature value of the target region being greater than a preset temperature threshold value.

In some embodiments, the implementation of execution of each step described in the above method may be reference to the corresponding part of the foregoing embodiments, which will not be repeated here.

In some embodiments of the present disclosure, the temperature information of the target region of the display control chip is acquired, in which the display control chip is configured to control display of a display screen by controlling display of a LED light plate of a display module of an electronic device. The brightness of the display screen of the electronic device is adjusted according to the temperature information of the target region. Therefore, the present disclosure may monitor the temperature information of the target region of the display control chip, adjust the brightness of the display screen according to the monitored temperature information of the target region, so as to control the temperature of the target region and improve performance of temperature control of the device.

Figure 5:
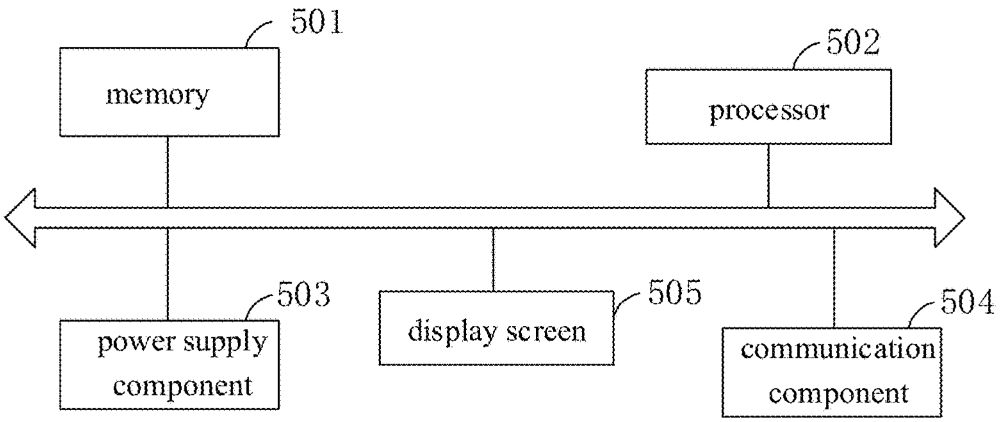
FIG. 5 is a block diagram illustrating an electronic device according to an embodiment of the present disclosure.

FIG. 5 is a block diagram illustrating an electronic device according to an embodiment of the present disclosure. As illustrated in FIG. 5, the electronic device may include a memory 501 and a processor 502. In addition, the electronic device also includes components such as a power supply component 503, a communication component 504 and a display screen 505.

The memory 501 for storing a computer program may be configured to store various other data to support an operation on an electronic device. Examples of such data include instructions for any applications or methods operated on the electronic device.

The memory 501 may be implemented using any type of volatile or nonvolatile memory device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The communication component 504 may be configured for data transmission with other devices.

The processor 502, for executing computer instructions stored in the memory 501, may be configured to: acquire temperature information of a target region of a display control chip, in which the display control chip is configured to control display of a display screen by controlling display of a LED light plate of a display module of an electronic device; adjust brightness of the display screen of the electronic device according to the temperature information of the target region.

Alternatively, the temperature information includes a temperature value, when adjusting the brightness of the display screen of the electronic device according to the temperature information of the target region, the processor 502 is configured to:

reduce the brightness of the display screen of the electronic device in response to a temperature value of the target region being greater than a preset temperature threshold value.

Alternatively, when reducing the brightness of the display screen of the electronic device, the processor 502 is configured to:

reduce the brightness of the display screen from a current brightness to brightness having a preset proportion to the current brightness.

Alternatively, when reducing the brightness of the display screen from the current brightness to the brightness having the preset proportion to the current brightness, the processor 502 is configured to:

reduce the brightness of the display screen from the current brightness to the brightness having the preset proportion to the current brightness according to a preset speed of brightness reduction.

Alternatively, when reducing the brightness of the display screen of the electronic device, the processor 502 is configured to:

reduce brightness of a second region of the display screen corresponding to the target region.

Alternatively, the second region of the display screen is located at a lower portion of the display screen, when reducing the brightness of the second region of the display screen corresponding to the target region, the processor 502 is configured to:

gradually reduce the brightness of the second region of the display screen from top to bottom.

Accordingly, embodiments of the present disclosure also provide a computer-readable storage medium stored with a computer program. When the computer-readable storage medium stores the computer program and the computer program is executed by one or more processors, one or more processors are caused to perform each step described in the method embodiments of FIG. 3.

Accordingly, embodiments of the present disclosure also provide a computer program product, including a computer program or computer instructions, and the computer program or computer instructions may be executed by the processor to perform each step described in the method embodiments of FIG. 3.

The communication component in FIG. 5 is configured to facilitate communication, wired or wirelessly, between the device where is communication component is in and other devices. The device where is communication component is in can access a wireless network based on a communication standard, such as WiFi, 2G, 3G, 4G/LTE or 5G, or a combination thereof. In an embodiment, the communication component receives a broadcast signal or broadcast associated information from an external broadcast management system via a broadcast channel. In an embodiment, the communication component further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

The power supply component in FIG. 5 provides power to various components of the device where the power supply component is in. The power supply component may include a power management system, one or more power sources, and any other components associated with the generation, management, and distribution of power in the device where the power supply component is in.

The display screen in FIG. 5 includes a screen, which may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The electronic device may further include an audio component.

The audio component is configured to output and/or input audio signals. For example, the audio component includes a microphone ("MIC") configured to receive an external audio signal when the device where the audio component is in in an operation mode, such as a call mode, a recording mode, and a voice recognition mode. The received audio signal may be further stored in the memory or transmitted via the communication component. In some embodiments, the audio component further includes a speaker to output audio signals.

In embodiments of the above device, storage medium and computer program product of the present disclosure, the temperature information of the target region of the display control chip is acquired, in which the display control chip is configured to control display of the display screen by controlling the display of the LED light plate of the display module of the electronic device. The brightness of the display screen of the electronic device is adjusted according to the temperature information of the target region. Therefore, the present disclosure may monitor the temperature information of the target region of the display control chip, adjust the brightness of the display screen according to the monitored temperature information of the target region, so as to control the temperature of the target region and improve performance of temperature control of the device.

Those skilled in the art will appreciate that embodiments of the present disclosure may be provided as a method, a system, or a computer program product. Therefore, the disclosure may take the form of a complete hardware embodiment, a complete software embodiment, or an embodiment combining software and hardware. Further, the disclosure may take the form of the computer program product implemented on one or more computer usable storage medium (including but not limited to a disk memory, a CD-ROM, an optical memory, etc.) including computer usable program codes.

The present disclosure is described with reference to the flowchart and/or block diagram of the method, device (system), and computer program product according to the embodiment of the disclosure. It should be understood that each flowchart and/or block in the flowchart and/or block diagram and the combination of processes and/or blocks in the flowchart and/or block diagram can be realized by computer program instructions. These computer program instructions may be provided to the processor of a general-purpose computer, special-purpose computer, embedded processor or other programmable data processing device to generate a machine, so that the instructions executed by the processor of the computer or other programmable data processing device generate a device for realizing the functions specified in one or more processes of the flowchart and/or one or more blocks of the block diagram.

These computer program instructions can also be stored in a computer-readable memory that can guide the computer or other programmable data processing device to operate in a specific way, so that the instructions stored in the computer-readable memory generate a manufacturing product including an instruction device, which implements the functions specified in one or more processes of the flowchart and/or one or more blocks of the block diagram.

These computer program instructions can also be loaded onto a computer or other programmable data processing device so that a series of operation steps are performed on the computer or other programmable device to produce computer implemented processing, so that the instructions executed on the computer or other programmable device provide steps for realizing the functions specified in one or more processes of the flowchart and/or one or more blocks of the block diagram.

In a typical configuration, a computing device includes one or more processors (CPUs), input/output interfaces, network interfaces, and memory.

Memory may include transitory memory, random access memory (RAM) and/or nonvolatile memory in computer-readable media, such as read only memory (ROM) or flash RAM. Memory is an example of a computer-readable medium.

Computer readable media include transitory and non-transitory, removable and non-removable media, and information storage can be realized by any method or technology. The information may be computer-readable instructions, data structures, modules of programs, or other data. Examples of storage media of a computer include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, read only optical disc read only memory (CD-ROM), digital versatile disc (DVD) or other optical storage Magnetic tape cartridge, magnetic tape, magnetic disk storage or other magnetic storage device or any other non-transmission medium can be used to store information that can be accessed by computing devices. As defined herein, computer-readable media does not include temporary computer-readable media, such as modulated data signals and carriers.

It should be noted that relationship terms such as first and second are only used herein to distinguish an entity or operation from another entity or operation, and it is not necessarily required or implied that there are any actual relationship or order of this kind between those entities and operations. Moreover, terms such as "comprise", "comprising" and any other variants are intended to cover non-exclusive contains, so that the processes, methods, articles or devices including a series of elements not only include those elements but also include other elements that are not listed definitely, or also include the elements inherent in the processes, methods, articles or devices. In the case of no more restrictions, the elements defined by the statement "comprise one . . . " do not exclude that other same elements also exist in the processes, methods, articles or devices including the elements."

The above is only the specific embodiment of the present disclosure, so that those skilled in the art can understand or realize the present disclosure. Various modifications to these embodiments will be obvious to those skilled in the art, and the general principles defined herein can be implemented in other embodiments without departing from the spirit or scope of the present disclosure. Therefore, the present disclosure will not be limited to these embodiments herein, but will conform to the broadest scope consistent with the principles and novel features disclosed herein.

What is claimed is:

1. A method for controlling a display screen, comprising:

acquiring temperature information of a target region of a display control chip, wherein the display control chip is configured to control brightness of a light-emitting diode (LED) light plate of a display module of an electronic device; and adjusting brightness of the display screen of the electronic device according to the temperature information of the target region;

wherein adjusting the brightness of the display screen of the electronic device according to the temperature information of the region of the display control chip comprises:

reducing the brightness of the display screen of the electronic device in response to determining that a temperature value of the region of the display control chip is greater than a first temperature threshold value;

the reducing the brightness of the display screen of the electronic device comprises:

acquiring a plurality of image frames played by the display screen within a first time period, wherein each image frame is at a same position of the plurality of image frames, and each image frame comprises a plurality of pixels, and each pixel corresponds to one pixel region of the display screen;

for each pixel, determining a plurality of voltage values of the pixel regions of the display screen corresponding to the pixel in the plurality of image frames;

determining pixels each satisfying that a variation range of the plurality of voltage values corresponding to the pixel meets a first voltage range as target pixels, and determining pixel regions of the display screen corresponding to the target pixels as a first region of the display screen; and reducing a brightness of the first region of the display screen.

2. The method according to claim 1, wherein reducing the brightness of the display screen of the electronic device comprises:

reducing the brightness of the display screen from a current brightness to brightness having a preset proportion to the current brightness.

3. The method according to claim 2, wherein reducing the brightness of the display screen from the current brightness to the brightness having the preset proportion to the current brightness comprises:

reducing the brightness of the display screen from the current brightness to the brightness having the preset proportion to the current brightness according to a preset speed of brightness reduction.

4. The method according to claim 1, wherein reducing the brightness of the display screen of the electronic device comprises:

reducing brightness of a second region of the display screen corresponding to the target region.

5. The method according to claim 4, wherein the second region of the display screen is located at a lower portion of the display screen, reducing the brightness of the second region of the display screen corresponding to the target region comprises:

gradually reducing the brightness of the second region of the display screen from top to bottom.

6. An electronic device, comprising:

a display module that comprises a light-emitting diode (LED) light plate and a display screen;

a display control chip coupled with the LED light plate and configured to control brightness of the LED light plate;

a temperature sensor provided around the display control chip and configured to acquire temperature information of a target region of the display control chip; and a main control chip that is configured to adjust brightness of the display screen according to the temperature information of the target region of the display control chip acquired by the temperature sensor;

wherein the brightness of the display screen of the electronic device is reduced in response to determining that a temperature value of the region of the display control chip is greater than a first temperature threshold value;

the display control chip is configured to:

acquire a plurality of image frames played by the display screen within a first time period, wherein each image frame is at a same position of the plurality of image frames, and each image frame comprises a plurality of pixels, and each pixel corresponds to one pixel region of the display screen;

for each pixel, determine a plurality of voltage values of the pixel regions of the display screen corresponding to the pixel in the plurality of image frames;

determine pixels each satisfying that a variation range of the plurality of voltage values corresponding to the pixel meets a first voltage range as target pixels, and determine pixel regions of the display screen corresponding to the target pixels as a first region of the display screen; and reduce a brightness of the first region of the display screen.

7. The electronic device according to claim 6, wherein the temperature information comprises a temperature value, the display control chip comprises a timing control chip and a backlight control chip; the backlight control chip is configured to control the brightness of the LED light plate;

the main control chip is configured to:

in response to determining that the temperature value of the first region is greater than a first temperature threshold value, transmit a display brightness reduction instruction to the display control chip, to enable the display control chip to reduce the brightness of the display screen by controlling the brightness of the LED light plate to reduce according to the display brightness reduction instruction.

8. The electronic device according to claim 6, wherein in a case of reducing the brightness of the display screen, the display control chip is configured to:

reduce the brightness of the display screen from a current brightness to brightness having a preset proportion to the current brightness.

9. The electronic device according to claim 8, wherein in a case of reducing the brightness of the display screen from the current brightness to the brightness having the preset proportion to the current brightness, the display control chip is configured to:

reduce the brightness of the display screen from the current brightness to the brightness having the preset proportion to the current brightness according to a preset speed of brightness reduction.

10. The electronic device according to claim 6, wherein in a case of reducing the brightness of the display screen, the main control chip is configured to:

reduce brightness of a second region of the display screen corresponding to the target region.

11. The electronic device according to claim 10, wherein in a case of reducing the brightness of the second region of the display screen corresponding to the target region, the main control chip is configured to:

gradually reduce the brightness of the second region of the display screen from top to bottom.

12. The electronic device according to claim 6, wherein in a case of transmitting the display brightness reduction instruction to the display control chip, the main control chip is configured to:

transmit the display brightness reduction instruction to the timing control chip to enable the timing control chip to transmit the display brightness reduction instruction to the backlight control chip.

13. The electronic device according to claim 6, wherein the display control chip is on a display control board, the display control board and the display module are stacked, and a region corresponding to the target region on the display screen forms a second region of the display screen.

14. The apparatus according to claim 6, wherein the display module further comprises a diffuser plate, at least one incremental sheet, a first diffuser sheet and a second diffuser sheet;

the LED light plate, the diffuser plate, the first diffuser sheet, the at least one incremental sheet, the second diffuser sheet and the display screen are stacked successively.

15. A non-transitory computer-readable storage medium having a program stored thereon, wherein when the program is executed by a processor, a method is implemented, the method comprises:

acquiring temperature information of a target region of a display control chip, wherein the display control chip is configured to control brightness of a light-emitting diode (LED) light plate of a display module of an electronic device; and adjusting brightness of the display screen of the electronic device according to the temperature information of the target region;

wherein adjusting the brightness of the display screen of the electronic device according to the temperature information of the region of the display control chip comprises:

reducing the brightness of the display screen of the electronic device in response to determining that a temperature value of the region of the display control chip is greater than a first temperature threshold value;

the reducing the brightness of the display screen of the electronic device comprises:

acquiring a plurality of image frames played by the display screen within a first time period, wherein each image frame is at a same position of the plurality of image frames, and each image frame comprises a plurality of pixels, and each pixel corresponds to one pixel region of the display screen;

for each pixel, determining a plurality of voltage values of the pixel regions of the display screen corresponding to the pixel in the plurality of image frames;

determining pixels each satisfying that a variation range of the plurality of voltage values corresponding to the pixel meets a first voltage range as target pixels, and determining pixel regions of the display screen corresponding to the target pixels as a first region of the display screen; and reducing a brightness of the first region of the display screen.

16. The storage medium according to claim 15, wherein reducing the brightness of the display screen of the electronic device comprises:

reducing brightness of a second region of the display screen corresponding to the target region.

* * * * *